US007103001B1

(12) United States Patent (10) Patent No.: US 7,103,001 B1
Cordsmeyer et al. (45) Date of Patent: Sep. 5, 2006

(54) SYSTEM AND METHOD FOR PLANNING PORTS IN DSL NETWORK ELEMENTS

(75) Inventors: Joel E. Cordsmeyer, Tucker, GA (US); Frederick Edwards, EllenWood, GA (US); Robert J. Bates, Alpharetta, GA (US); James R. Miller, Lawrenceville, GA (US); Kenneth D. Franklin, Cumming, GA (US)

(73) Assignee: Bell South Intellectual Property Corp., Wilmington, DE (US)

( * ) Notice: Subject to any disclaimer, the term of this patent is extended or adjusted under 35 U.S.C. 154(b) by 965 days.

(21) Appl. No.: 10/025,710

(22) Filed: Dec. 19, 2001

(51) Int. Cl.
*H04J 1/16* (2006.01)
(52) U.S. Cl. ...................................... 370/241
(58) Field of Classification Search ................ 370/535, 370/537, 428, 411–418, 422, 424, 465
See application file for complete search history.

(56) References Cited

U.S. PATENT DOCUMENTS

| 6,028,867 A * | 2/2000 | Rawson et al. ............. 370/463 |
| 6,889,385 B1 * | 5/2005 | Rakib et al. ................ 725/119 |
| 2004/0022237 A1 * | 2/2004 | Elliott et al. ................ 370/356 |

* cited by examiner

*Primary Examiner*—Dang T. Ton
(74) *Attorney, Agent, or Firm*—Potomac Patent Group PLLC

(57) ABSTRACT

A system for automatically planning firmware card ports on multiplexors in a DSL network is disclosed. The system is operable to query element management systems (EMS's) in a DSL network to identify the multiplexor devices that each of the EMS's is dedicated to managing. Thereafter, the system queries the multiplexor devices identified as being managed by a particular EMS for the planning status of the multiplexor's ports. Upon identifying unplanned ports, and those that are inconsistent with the prescribed plan, the system plans the ports consistent with a prescribed planning arrangement.

9 Claims, 4 Drawing Sheets

SYSTEM AND METHOD FOR PLANNING PORTS IN DSL NETWORK ELEMENTS

FIELD OF THE INVENTION

The present invention relates generally to telecommunications systems, and more particularly, to systems and methods for managing resources in a broadband network.

BACKGROUND OF THE INVENTION

Demand for in-home data and telephony services has grown dramatically in recent years and is expected to continue to increase. Accordingly, providers of data and telephony services have sought to design and deploy broadband networks with increased delivery capacity.

One broadband technology that has become particularly popular is digital subscriber lines (DSL). DSL offers increased data transfer rates and integrated telephony and data services using the existing public switched telephone network (PSTN), which previously was used exclusively for telephone voice communications.

As the demand for DSL service has grown, service providers have needed to build-out their infrastructure for providing DSL service. In particular, service providers have needed to quickly install large numbers of network elements devoted to providing DSL service. For example, service providers have needed to install large numbers of digital subscriber line multiplexors (DSLAM's), remote access multiplexors (MiniRAMs), subtends, element management systems, as well as other network elements, in a geographically distributed network. Installing, managing, and administering these quickly expanding, geographically distributed DSL networks has become increasingly complex, time consuming, and expensive.

One aspect of DSL network maintenance that is very cost and labor intensive is pre-provisioning, or planning of DSL multiplexor devices, cards, and ports. Generally, DSL multiplexor devices such as for example, DSLAM's and MiniRAM's, serve as a termination point for DSL subscriber lines. In some instances, DSL multiplexor devices may also serve as a termination point for connections between multiplexing devices such as for example, between a MiniRAM and a DSLAM. Typically, DSL multiplexor devices comprise a series of slots or ports, usually arranged in rows on shelves, into which termination firmware cards are placed. These are designated as network or line terminated cards wherein the line cards are used to terminate customer lines and network cards are used to terminate network lines to the ATM core. The characteristics of the termination firmware card that is inserted into a port depend upon the function to be performed by the DSL line terminating in the port. For example, if the line is used to service an individual customer, an ADLT card from Alcatel may be used. Conversely, if the line serves a subtending remote multiplexor, a D1LT card from Alcatel is used Prior to physically placing a card in a port of a multiplexing device, the device must be pre-provisioned, which comprises a process often referred to as planning. Planning is the process by which a particular port of a DSL multiplexing device, such as a DSLAM, is configured to accept a card of a particular type. For example, if a port will ultimately receive a model D1LT card manufactured by Alcatel Corporation for connecting to another multiplexing device, the slot needs to be configured to operate with that particular card. Similarly, if a card port is to accept a model ADLT card manufactured by Alcatel Corporation for providing DSL service to an end user, the port needs to be configured to operate with that particular card. Generally, planning of a port comprises programming the multiplexor device with information identifying the card type to be accepted in the port, the software release that the card will run, and profile information regarding the card to be placed in the port. The ports of the multiplexor devices are configured to operate in accordance with the information provided during the planning process.

In existing systems, DSL card planning is accomplished manually. Typically, a technician must visit the multiplexor and plan the port. Often, the technician must call a control center to retrieve the planning information.

Applicants have noted that relying on technicians to manually plan card ports on as-needed basis is costly, inefficient, and prone to human error. Such inefficiencies may be tolerable when only a few cards need planning, but quickly become unsatisfactory when, as is now the situation, thousands of DSL lines are ordered on a daily basis.

Accordingly, Applicants have recognized a need in the art for automated systems and methods for planning DSL multiplexor card ports.

SUMMARY OF THE INVENTION

The present invention meets these and other needs in the art.

Applicants have invented systems and methods for automatically planning DSL multiplexor ports. Systems and methods in accordance with the invention are operable in DSL networks comprising DSL line multiplexor devices such as for example, DSLAM's and MiniRAM's, and element management systems (EMS's) for managing the operation of these same multiplexor devices. As is explained in detail below, a DSL network may comprise a large number of EMS's, with each EMS having a large number of multiplexors that it is dedicated to managing. A computing system, which may be referred to as a port planning tool (PPT), is operable to query the EMS's to identify the multiplexor devices that the particular EMS's is dedicated to manage. Thereafter, the PPT queries the multiplexor devices identified as being managed by a particular EMS for the planning status of the multiplexor's ports. Using this status information, the PPT identifies unplanned ports as well as ports that may be inconsistent with the service provider's prescribed planning arrangement. Upon identifying unplanned ports, and those that are inconsistent with the service provider's prescribed planning arrangement, the PPT plans the ports consistent with the prescribed plan. The PPT is operable to contact each EMS in the network and plan the ports for the multiplexor devices managed by each EMS.

Additional aspects of the invention are described in detail below.

BRIEF DESCRIPTION OF THE DRAWINGS

Other features of the invention will be further apparent from the following detailed description of presently preferred exemplary embodiments of the invention taken in conjunction with the accompanying drawings, of which.

DETAILED DESCRIPTION OF THE INVENTION

Figure 1:
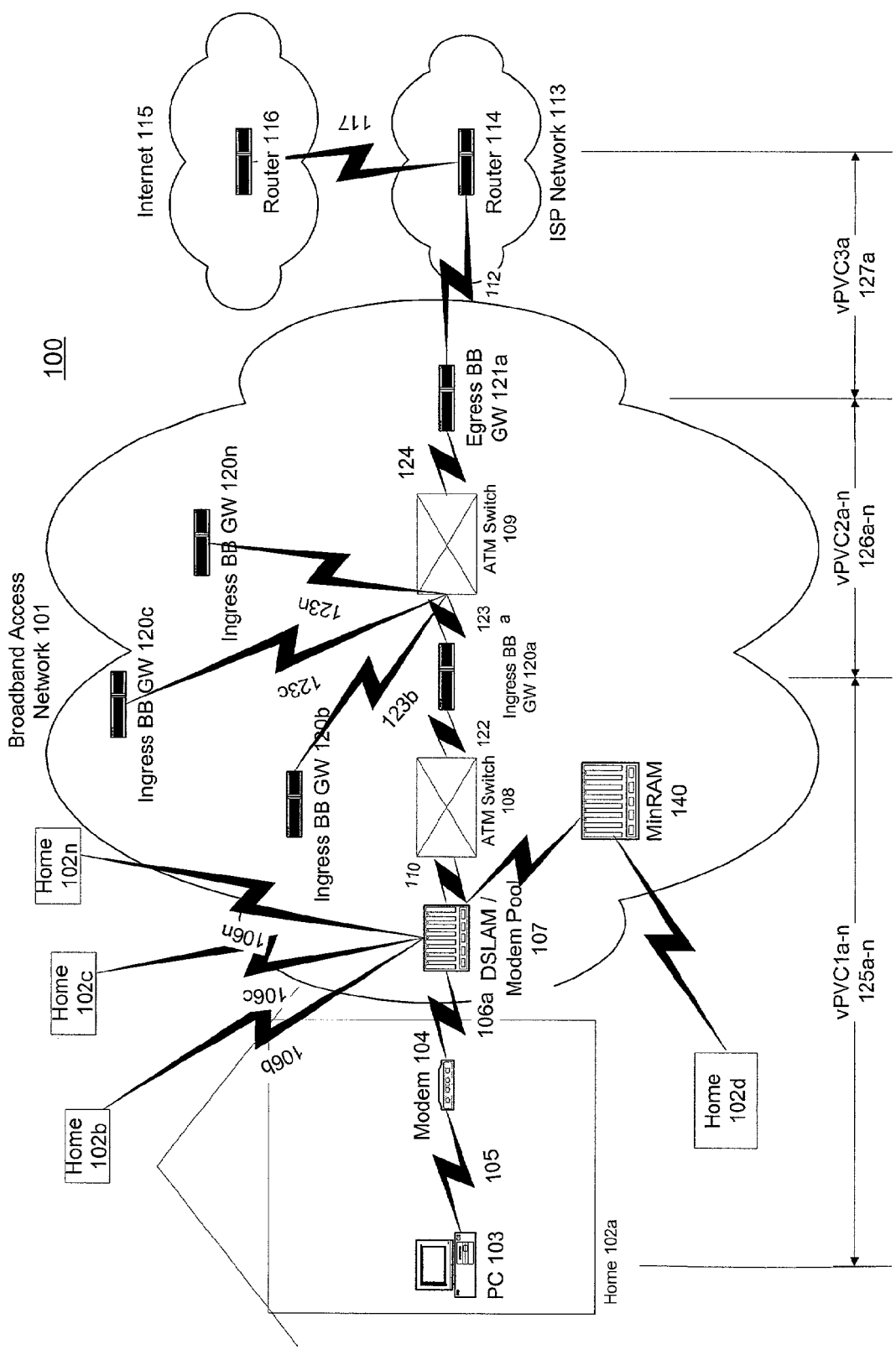
FIG. 1 is a high level diagram of an exemplary DSL network.

Systems and methods with the above-mentioned beneficial features in accordance with a presently preferred exemplary embodiment of the invention will be described below with reference to FIGS. 1–4. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

Generally, applicants have invented systems and methods for automatically planning DSL multiplexor ports. A computing system, referred to as a port planning tool (PPT), is operable to query EMS's in a DSL network to identify the multiplexor devices that each of the EMS's is dedicated to manage. Thereafter, the PPT queries the multiplexor devices identified as being managed by a particular EMS for the planning status of the multiplexor's ports. Using this status information, the PPT identifies unplanned ports as well as ports that may be inconsistent with a prescribed planning arrangement. Upon identifying unplanned ports, and those that are inconsistent with the prescribed plan, the PPT plans the ports consistent with the prescribed planning arrangement.

Prior to explaining the details of an illustrative embodiment of the invention, it is useful to provide a description of a suitable exemplary environment in which the invention may be implemented.

Exemplary DSL Network Environment

1. Exemplary DSL Network

Digital Subscriber Line (DSL) is a technology that converts existing twisted-pair telephone lines into access paths for multimedia and high-speed data communications. DSL services promise to dramatically increase the speed of copper wire based transmission systems without requiring expensive upgrades to the local loop infrastructure. As used herein, xDSL refers to the numerous variations of DSL technology using the Bellcore acronyms such as ADSL (Asymmetric DSL), HDSL (high bit-rate DSL), RADSL (rate-adaptive DSL), and the like. New and improved versions of xDSL are in constant development and the invention is not intended to be limited to any single variation of the technology.

Most xDSL signals fall within the frequency range of 4 KHz to 2.2 MHz, with the range of 0 to 4 KHz reserved for the transmission of analog voice signals for plain old telephone service (POTS). The theoretical maximum amount of bandwidth between 4 KHz and 2.2 MHz is almost 70 Mbps of digital data spectrum. In practice however, only lab test conditions have ever reached higher than 60 Mbps and currently available products typically use 2 Mbps to 8 Mbps.

The different types of xDSL technologies may also be categorized as either symmetric EC xDSL or asymmetric (FDM) xDSL. A first class of EC xDSL includes Integrated Services Digital Network (ISDN), High-Bit-Rate DSL (HDSL), and Single-Line DSL (SDSL). A second class of EC xDSL includes Asymmetric DSL (ADSL) and Rate Adaptive DSL (RADSL). The modulation technologies employed with the various types of xDSL include 2-binary 1-quaternary (2B1Q) for ISDN and HDSL, carrierless amplitude phase modulation (CAP) for HDSL, SDSL and RADSL, and discrete multi-tone modulation (DMT) for ADSL and RADSL.

Generally, DMT divides the upstream and downstream bands into smaller individual or discrete bands. The modems on either end listen to these discrete bands as smaller channels within the main upstream or downstream channel. Often, one of these smaller bands will be disrupted by noise, rendering the information carried within that band useless. Rather than toss away all the information sent at that instant across the entire upstream or downstream band, only that small part is lost and needs to be retransmitted.

With CAP, the overall amplitude or power of the signal is modulated. The signal is not safeguarded against noise and often suffers from lost information, which accounts in part for the lower transmission speeds of CAP-based DSL technologies. With amplitude modulation, there is also more loss over longer ranges. The benefits of CAP over DMT are that it is simpler in design and therefore cheaper, requires less power, and generates less heat. Both power consumption and heat are serious factors when it comes to housing many of these systems together (as in a central office). DMT however, often provides the best results and maintains the full bandwidth at its maximum range of 18,000 feet. CAP signals degrade quickly after 10,000 feet.

Typical xDSL systems are implemented as follows. At the customer premises a splitter is provided which separates the xDSL signals (i.e., digital data signals) from the POTS analog voice signals. The main purpose of the splitter is to shield ordinary telephones from the high frequency xDSL signals that can have disastrous effects on the telephone or human ear. The data line from the splitter connects to an xDSL modem and the analog line connects to the telephone. With xDSL Lite and some other product models, there is no external splitter or it is combined into the xDSL modem unit. An Ethernet line will usually link the xDSL modem to the customer premises PC.

The twisted pair from the customer premises connects to an xDSL access multiplexor such as, for example a DSLAM, typically located at the incumbent local exchange carrier (ILEC) central office (CO). The twisted pair from the customer premise may also pass through a neighborhood wiring distribution frame, which is a central point where the wire pairs from several customer premises come together, and/or an ILEC remote terminal before reaching the CO. Typically, a DSLAM is a multi-module unit that houses many CO-side xDSL modems within a single shelf much like the analog modem racks of today. At the DSLAM the voice and data lines are split out along separate paths. The digital data signal goes into either an ATM concentrator or an Internet Protocol router. The analog voice signals are connected to the CO phone switch. Thus, the digital data packets go through the router out to the Internet, and the analog voice signals go through the phone switch and into the public switched telephone network.

ADSL is one particularly promising and popular form of xDSL. ADSL can transmit up to 6 Mbps to a subscriber, and as much as 832 kbps or more in both the downstream and upstream directions. Such rates expand existing access capacity by a factor of 50 or more without the need to install new wiring or cabling. An ADSL circuit connects an ADSL modem on each end of a twisted-pair telephone line, creating three information channels—a high speed downstream channel, a medium speed duplex channel, depending on the implementation of the ADSL architecture, and a POTS or ISDN channel. The POTS/ISDN channel is split off from the digital modem by filters, thus guaranteeing uninterrupted POTS/ISDN, even if ADSL fails. The high speed channel ranges from 1.5 to 6.1 Mbps, while duplex rates range from 16 to 832 kbps. Each channel can be submultiplexed to form multiple, lower rate channels, depending on the system.

ADSL modems provide data rates consistent with North American and European digital hierarchies and can be purchased with various speed ranges and capabilities. The minimum configuration provides 1.5 or 2.0 Mbps downstream and a 16 kbps duplex channel; others provide rates of 6.1 Mbps and 64 kbps duplex. Products with downstream rates up to 8 Mbps and duplex rates up to 640 kbps are currently available. ADSL modems also can accommodate ATM transport with variable rates and compensation for ATM overhead, as well as IP protocols. Downstream data rates depend on a number of factors, including the length of the copper line, its wire gauge, presence of bridged taps, and cross-coupled interference. Line attenuation increases with line length and frequency, and decreases as wire diameter increases.

FIG. 1 shows an exemplary ADSL based broadband access architecture 100. In order for an IP enabled device (e.g., personal computer 103 in home 102a) to establish a service session with a source on the Internet 115, the IP enabled device first establishes an access session with an Open Systems Interconnection (OSI) model layer 2/3 communications element (e.g., router 114) in an Internet service provider (ISP) network (e.g., ISP network 113) through an asynchronous transfer mode (ATM) based broadband access network (e.g., broadband access network 101) with a broadband access device (e.g., DSL modem 104) connected to the local loop (e.g., link 106a). An IP client (not shown) on the IP enabled device secures an IP address from the ISP using Dynamic Host Configuration Protocol (DHCP) from a DHCP server (not shown) in communication with the ISP's router. The DHCP server temporarily allocates or leases a unique IP address to the IP client. The IP client may now obtain IP based services available on the ISP network and beyond by sending and receiving packets to and from the ISP's router through the broadband access network. Sources on the Internet 115 are reached by utilizing a communications link between the ISP network and the Internet 115 (e.g., communications link 117).

In addition to the layer 2 communications elements (e.g., asynchronous transfer mode (ATM) switches 108 and 109), layer 2/3 communications elements also form a part of broadband access network 101. Specifically, a plurality of layer 2/3 communications elements (e.g., ingress broadband gateways 120a–n) reside after various layer 2 communications elements (e.g., ATM Switch 108) lying near ingress points for access device IP traffic (e.g., IP traffic from personal computer 103), and a plurality of layer 2/3 communications elements (e.g., egress broadband gateway 121a) reside after layer 2 communications elements (e.g., ATM Switch 109) lying near egress points for access device IP traffic destined for ISP networks (e.g., ISP network 113) linked to broadband access network 101. In exemplary network 100, ATM switch 108 may comprise, for example, a Lucent CBX 500 multiservice WAN switch, and ATM switch 109 may comprise, for example, a Lucent GX 550 multiservice WAN switch. Ingress and egress broadband gateways 120, 121 comprise, for example, Nortel 5000 Broadband Service Nodes.

Each of the layer 2/3 communications elements in broadband access network 101 supports the creation of layer 3 communications sessions between various communications elements within and without network 101 using layer 3 protocols such as IP. The layer 2/3 communications elements also support the creation of virtual layer 2 communications sessions or "virtual PVCs(vPVCs)" using one or more of the following protocols: Point-to-Point Protocol (PPP) over Ethernet (PPPoE), PPP over ATM (PPPoA), Layer 2 Tunneling Protocol (L2TP), Point-to-Point Tunneling Protocol (PPTP), and/or Switched Multimegabit Data Service (SMDS) Interface Protocol (SIP). A PVC is a "permanent" virtual circuit and provides an "always on" connection whether the subscribers is actively using it or not. Thus, a series of three layer 2 virtual PVCs (e.g., vPVC1a 125a, vPVC2a 126a, and vPVC3a 127a) extend from an access device (e.g., ADSL modem 104) to an ISP (e.g., ISP network 113) through broadband access network 101 (versus having a single layer 2 PVC extending from an access device to an ISP as in other broadband access networks).

The first layer 2 vPVC (e.g., vPVC1a 125a) extends from an access device (e.g., ADSL modem 103) to one of the ingress layer 2/3 communications elements (e.g., ingress broadband gateway 120a), and is the only vPVC devoted exclusively to a single IP subscriber. Typically the first layer 2 vPVC is a user authenticated PPP session. In one embodiment of the network 101 the first layer 2 vPVC is a user authenticated PPPoE session where the IP enabled device (or the operator thereof) supplies a username and domain (e.g., "user1@domain1"). Based on the domain provided, the first layer 2/3 communications element establishes a virtual layer 2 connection using L2TP over the remaining two layer 2 vPVCs to reach the appropriate ISP and the ISP provides the IP enabled device an IP address for obtaining IP based services. This model allows for the creation of access sessions with different ISPs depending on the domain provided by the IP enabled device. This model also allows IP services to be billed to a particular user on a per access session basis.

The second vPVC (e.g., vPVC2a 126a) extends from the foregoing ingress layer 2/3 communications element (e.g., Ingress Broadband Gateway 120a) to one of the egress layer 2/3 communications elements (e.g., Egress Broadband Gateway 121a). Through the use of a tunneling protocol such as L2TP, PPP aggregation occurs at the layer 2/3 ingress communications element and the multiple PPP communications sessions between access devices (e.g., access devices in homes 102b–n) served by the ingress layer 2/3 communications element are funneled into the second vPVC. The third vPVC (e.g., vPVC3a 127a) extends from the foregoing egress layer 2/3 communications element (e.g., Egress Broadband Gateway 121a) to the layer 2/3 communications element in the ISP network. In this embodiment of the invention the layer 2/3 communications element in the ISP network is an LNS capable router (e.g., layer 2/3 communications element 114). Again, through the use of a tunneling protocol such as L2TP, PPP aggregation occurs at the egress layer 2/3 communications element and the multiple PPP communications sessions from multiple L2TP IBG tunnels are concentrated onto a single L2TP tunnel by the egress broadband gateway and are funneled into the third virtual PVC. The third virtual PVC delivers a large (doubly aggregated) L2TP tunnel to the LNS router 114 where the PPP sessions are terminated and IP packets are once again routed normally.

As shown in FIG. 1, each twisted wire pair from customer premises 102a–n housing an xDSL modem 104 connects to a multiplexor device such as, for example DSLAM 107 or MiniRAM 140. Furthermore, a connection from MiniPAM 140 terminates in DSLAM 107. In exemplary network 100, DSLAM 107 may be, for example, an Alcatel 7300 DSL Access Line Multiplexor. Generally, the physical termination of an xDSL line in a multiplexor device comprises a firmware card, which is placed in a port or slot in the multiplexor device. The characteristics of the firmware cards vary depending upon the purpose of the card and the type of service that is being provided over the particular xDSL line. For example, if the DSL line terminating in a particular port will provide frame relay services, a card that supports frame relay is placed in the port. Similarly, if the xDSL line that will terminate in a port will be used to connect to another multiplexing device, a card supporting this function is placed in the port.

Prior to provisioning a firmware card in a port of a multiplexor, the port needs to be planned to operate with the particular card. In other words, each port needs to be configured to operate with the particular firmware card that is to be placed in the port. Systems and methods for automatically planning DSL multiplexor ports are described below.

2. Exemplary DSL Network Management System

Figure 2:
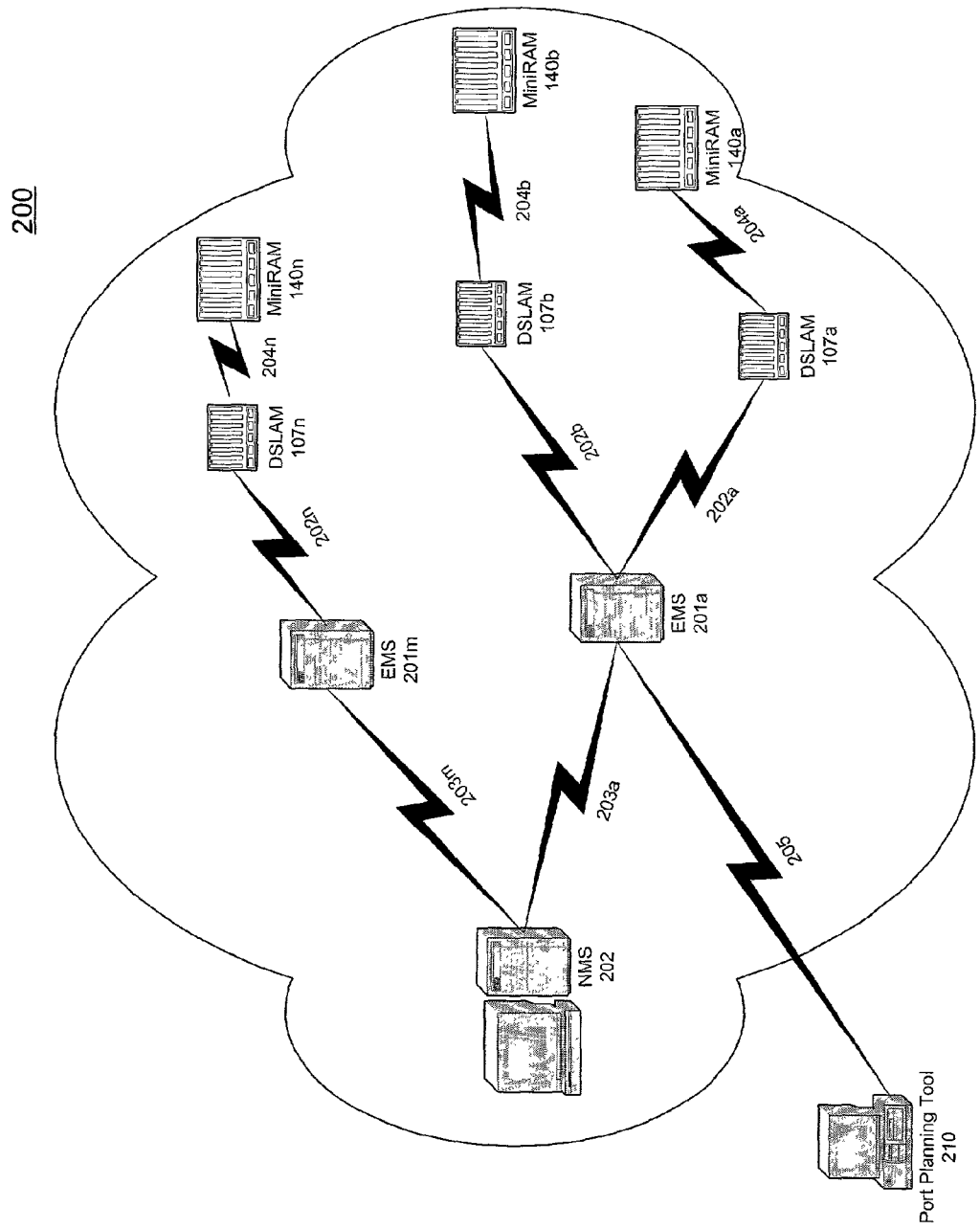
FIG. 2 is a high level diagram of an exemplary DSL element management network.

FIG. 2 depicts an illustrative DSL network management system 200 in which systems and methods for planning DSL ports in accordance with the invention may operate. As shown, system 200 comprises at least one network manager (NM) 202, a plurality of element managers (EMSs) 201a–201m, DSLAMs 107a–n forming a portion of broadband access network 101, MiniRAMs 140a–n also forming a portion of broadband access network 101, and a plurality of communication paths or links 202a–n, 203a–m, 204a–m between the NM, EMSs, DSLAMs, and MiniRAMs. NM 202 coordinates the operation of nodes, elements, objects, cards, physical links, equipment, and the like, within network management system 200. DSLAMs 107a–n and MiniRAMs 140a–n comprise managed elements within network management system 201. EMSs 201a–m comprise intermediaries between NM 202 and the broadband network elements including DSLAMs 107a–n and MiniRAMs 140a–n. As an intermediary, the EMSs interpret messages, such as simple network management protocol (SNMP) messages, to and from nodes in network management system 201. In one embodiment of the invention communication between the NM 202 and the EMSs 201a–m is via X.25, serial, TCP/IP, or UDP/IP connection while communication between the EMSs 201a–m and the DSLAMs 107a–n is via SNMP over UDP/IP. In an illustrative embodiment of system 200, NM 202 comprises, for example, an Alcatel 5620 Network Manager, EMSs 201a–m comprise, for example, Alcatel 5526 Access Management Systems, DSLAMs 107a–n comprise, for example, Alcatel 7300 DSL Subscriber Access Platform.

Port Planning Tool (PPT) 210 operates to communicate with EMSs 201a–n over communication link 205 to automatically plan ports on multiplexor devices such as for example, DSLAMs 107a–n and MinRAMs 140a–n. PPT 210 is further capable of generating and displaying reports detailing the information retrieved from EMSs 201a–n, DSLAMs 107a–n, and MiniRAMs 140a–n, and the planning of ports that has been automatically implemented.

PPT 210 is operable to contact EMSs 201a–n, retrieve query information from EMSs 201a–n, retrieve query information from network devices 107a–n and 140a–n, and configure or plan network devices 107a-n and 140a-n. In the illustrative embodiment, PPT 210 communicates with EMSs 201a–n via a designated communication port such as for example, port 14000. Generally, a transport layer interface (TLI) protocol is used for communicating with EMSs 201a–n.

Figure 3:
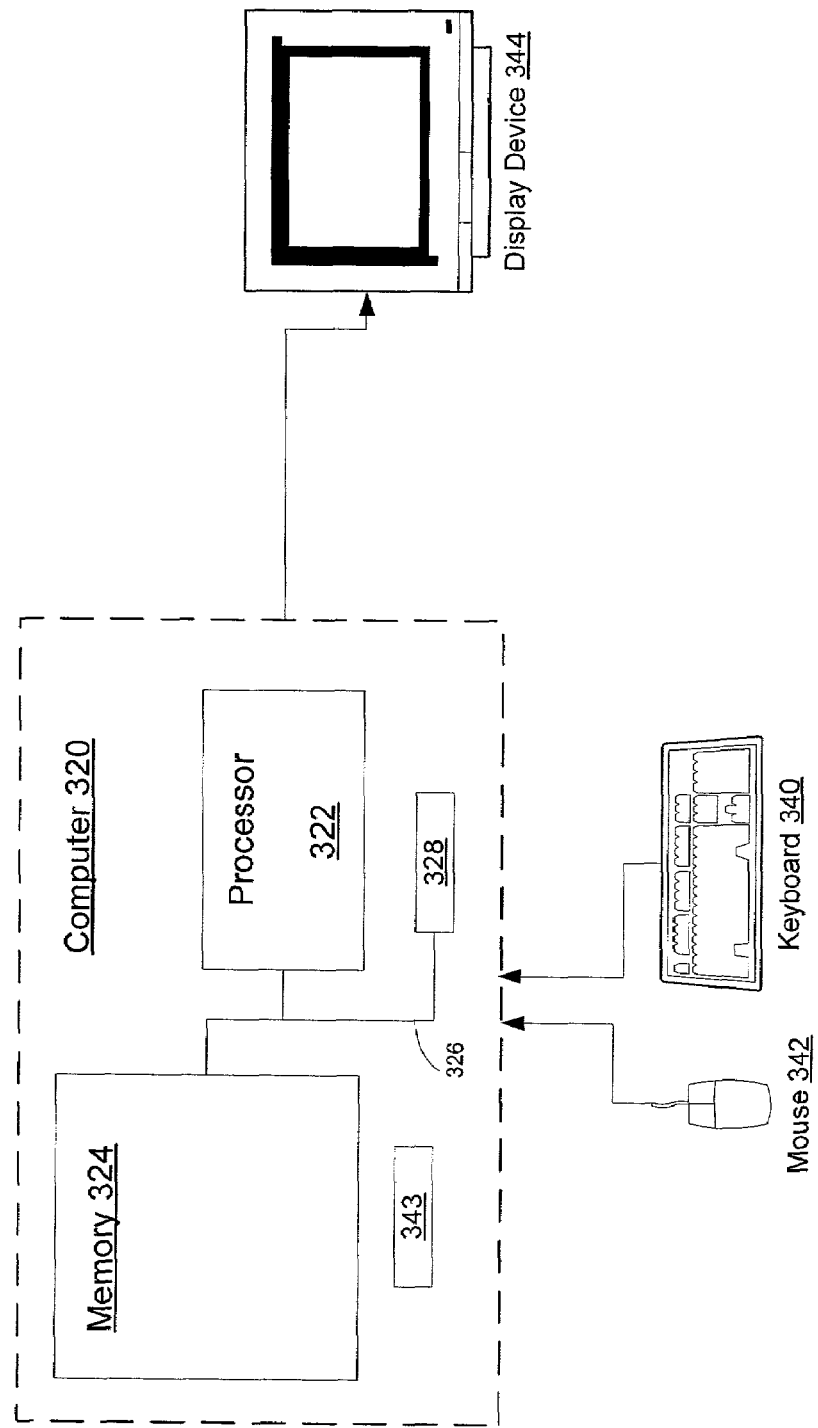
FIG. 3 is a block diagram of a computing device for use in a system in accordance with an aspect of the invention.

PPT 210 may be implemented on a generic computing system such as is shown in FIG. 3. As shown, computing device 320 includes processing unit 322, system memory 324, and system bus 326 that couples various system components including system memory 324 to the processing unit 322. The system memory 324 might include read-only memory (ROM) and random access memory (RAM). The system might further include hard-drive 328, which provides storage for computer readable instructions, data structures, program modules and other data. A user may enter commands and information into the computer 320 through input devices such as a keyboard 340 and pointing device 342. A monitor 344 or other type of display device is also connected to the system for output. Communications device 343, which may be for example a TCP/IP enable device, provides for communications in system 200. Processor 322 can be programmed with instructions to interact with other computing systems so as to perform the algorithms described below with reference to FIG. 4. The instructions may be received from network 200 or stored in memory 324 and/or hard drive 328. Processor 322 may be loaded with any one of several computer operating systems such as Windows NT, Windows 2000, or Linux. Those skilled in the art recognize that while PPT 210 is illustrated as a desktop computing system, other computing devices such as for example, laptop and handheld computing devices might alternatively be employed.

Automated Planning of DSL Multiplexor Ports

The present invention is directed to systems and methods for automatically planning ports on DSL multiplexor elements. Generally, planning results in a port being configured to operate with a card having a particular set of characteristics. Thus, the configuration established during planning of a port depends upon the characteristics of the card that is expected to be received in the port. The process of planning a port comprises defining for the particular port, the card type that will be placed in the port (e.g. whether it is a D1LT or ADLT card), a profile for the card (e.g. the sync rate), and the version of software that will run on the card. Once a port has been planned, and a card in accordance with the planned configuration is placed in the port, the service should operate.

DSL multiplexors often comprise a plurality of ports, which may be arranged for example, in rows. Each port in the plurality may be used for any number of uses and needs to be planned accordingly. Typically, DSL service providers have developed prescribed planning arrangements that identifying how the rows of ports on multiplexing machines are to be planned. For example, a prescribe planning arrangement for a DSLAM or any other multiplexing device may define that a particular row, or a prescribed number of ports be planned and used for DSL user line termination, while another row of ports or number of ports be planned and used for terminating connections from other multiplexor devices. Indeed, a prescribed planning arrangement may define that particular ports be planned for a defined software version or a defined card type.

In an exemplary embodiment of a system in accordance with the invention, PPT 210 is operable to query EMS's 201a–n in exemplary DSL network 100 to identify DSL line multiplexor devices 107a–n and 140a–n for which each EMS device has been defined to manage. Thereafter, PPT 210 queries each of the identified multiplexor devices, identifies unplanned and incorrectly planned ports, and plans the ports accordingly.

Figure 4:
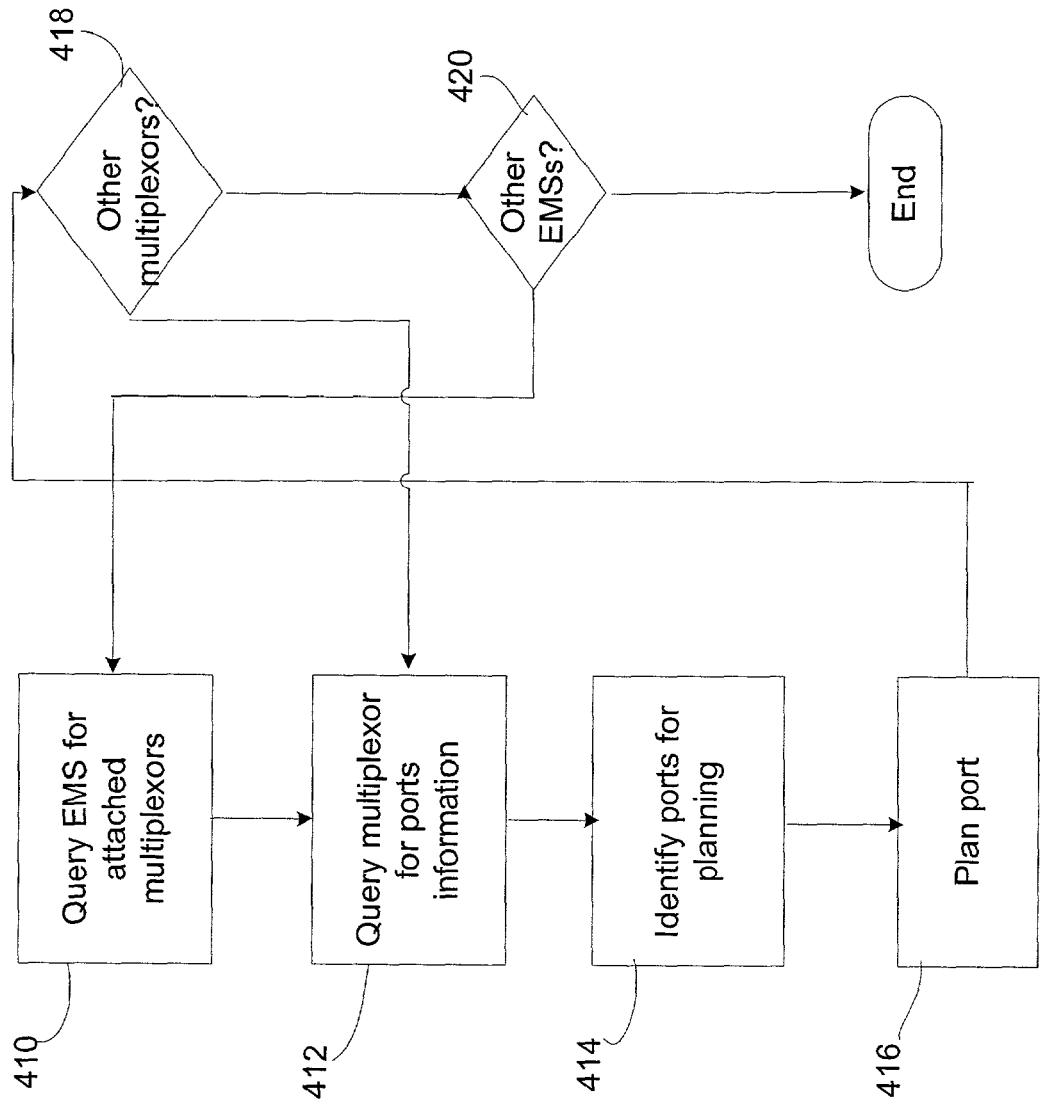
FIG. 4 is a flow diagram of a process for automatically planning DSL multiplexor ports.

FIG. 4 provides a flow diagram of a process for automatically planning ports in accordance with an aspect of the invention. As shown, at step 410, PPT 210 queries an EMS 201*a* in network 200 to identify the multiplexors for which the particular EMS 201 has been designated to manage. Multiplexors are identified in query results by cilli code or the like. In the illustrative embodiment, PPT 210 communicates with EMSs 201*a* using an unassigned port such as for example, port 14000, and uses TLI protocol commands.

At step 412, PPT 210 queries one of the multiplexors 107*a*, 140*a* identified as being managed by the particular EMS 201*a* for the planning status of the ports on the particular multiplexor. Specifically, PPT 210 queries for an indication for each port as to whether the port is planned and if so, the software version, the card type, and the profile information that was previously planned.

At step 414, PPT 210 identifies unplanned ports and planned ports that are inconsistent with a prescribed planning arrangement. Accordingly, at step 414, ports that have previously been planned, but which are inconsistent with the prescribed planning arrangement are identified and designated for replanning.

At step 416, PPT 210 causes unplanned ports to be planned according to the prescribed planning arrangement. For example, the unplanned ports are configured to operate with cards of a particular type and profile and running a particular version of software. Also, planned ports that are inconsistent with the prescribed planning arrangement are re-planned.

At step 418, PPT 210 determines whether there are other DSL multiplexing devices designated as being managed by the particular EMS 201*a*. If so, PPT 210 repeats the process beginning at step 412. If at step 418, there are no further multiplexing devices associated with the particular EMS 201*a*, at step 420, PPT 210 determines whether there are other EMS's 201*n* in the network for which automatic planning of ports has not been completed. If so, the process is repeated beginning at step 410. If there are no other EMS's for which planning is needed, the process ends.

PPT 210 is operable to format the data retrieved from EMSs 201*a–n* and multiplexors 204*a–n* and 240*a–n*, generate reports, and display the reports. Accordingly, administrators of network 100 can review the status of port planning and monitor the progress of the automated planning process.

Thus, systems and methods for planning ports in DSL multiplexing devices have been disclosed. These novel systems and methods allow administrators to automatically identify the planning status of ports on DSL multiplexing devices throughout a DSL network. Specifically, administrators can automatically identify ports that are unplanned and ports that may be planned but which conflict with a prescribed planning arrangement. Furthermore, administrators can rely on systems and methods in accordance with the invention to automatically plan any unplanned ports and to correct those ports that are incorrectly planned. Automatic identification of port planning status and automatic port planning greatly simplifies administration of the DSL network and facilitates quick, efficient, and reliable provisioning of DSL services to customers.

Those skilled in the art understand that computer readable instructions for implementing the above-described processes, such as those described with reference to FIG. 4, can be generated and stored on one of a plurality of computer readable media such as a magnetic disk or CD-ROM. Further, a general purpose computer such as that described with reference to FIG. 3 may be arranged with other similarly equipped computers in a network, and may be loaded with computer readable instructions for performing the above described processes. Specifically, referring to FIG. 3, microprocessor 322 may be programmed to operate in accordance with the above-described processes.

While the invention has been described and illustrated with reference to specific embodiments, those skilled in the art will recognize that modification and variations may be made without departing from the principles of the invention as described above and set forth in the following claims. For example, while the invention has been described in connection with planning of DSLAM's and MiniRAM's, the systems and methods may be employed to plan other types of DSL multiplexing devices as well. Accordingly, reference should be made to the appended claims as indicating the scope of the invention.

What is claimed is:

1. A method for planning firmware card ports on DSL multiplexors, said method comprising the steps of:
   querying an element management system for the DSL multiplexors; and
   for at least one multiplexor identified at the element management system,
      identifying to the multiplexor the characteristics of a card to be placed in at least one of the ports on the multiplexor; and
      identify incorrectly planned ports by identifying planned ports that conflict with a predefined planning arrangement.

2. A method for planning firmware card ports in a DSL network, said method comprising the steps of:
   retrieving from an element management system an identification of one or more multiplexor devices;
   retrieving from one of the multiplexor devices identified by the element management system information identifying the planning status of ports on the multiplexor device; and
   planning the ports on the multiplexor device based on the planning status information.

3. The method of claim 2, wherein the step of retrieving from an element management system an identification of one or more multiplexor devices comprises requesting information from the element management system identifying multiplexors that are managed by the element management system.

4. The method of claim 2, wherein the step of retrieving from an element management system an identification of one or more multiplexor devices comprises forwarding a transport layer interface protocol (TLI) to an element management system.

5. The method of claim 2, wherein the step of identifying to the multiplexor the characteristics of a card to be placed in at least one of the ports of the multiplexor comprises identifying at least one of a card type, a card profile, and a software version.

6. The method of claim 2, further comprising the step of identifying unplanned ports on the multiplexor identified by the element management system.

7. The method of claim 6, wherein the step of identifying unplanned ports comprises processing the information identifying the planning status of ports on the multiplexor device.

8. The method of claim 2, further comprising the step of identifying incorrectly planned ports on the multiplexor identified by the element management system.

9. The method of claim 8, wherein the step of identifying incorrectly planned ports comprises processing the information identifying the planning status of ports on the multiplexor device.

* * * * *